United States Patent
Chung et al.

(10) Patent No.: US 7,947,386 B2
(45) Date of Patent: May 24, 2011

(54) SOLID OXIDE FUEL CELL MODULE, FUEL CELL SYSTEM USING THE SAME AND MANUFACTURING METHOD THEREOF

(75) Inventors: Jong Shik Chung, Ulju-kun (KR); Bu Ho Kwak, Pohang (KR); Yong Wook Sung, Pohang (KR); Lim Kim, Pohang (KR)

(73) Assignee: Postech Foundation, Pohang, Kyungsangbook-Do (KR)

( * ) Notice: Subject to any disclaimer, the term of this patent is extended or adjusted under 35 U.S.C. 154(b) by 1018 days.

(21) Appl. No.: 11/607,901

(22) Filed: Dec. 4, 2006

(65) Prior Publication Data

US 2007/0134539 A1 Jun. 14, 2007

(30) Foreign Application Priority Data

Dec. 8, 2005 (KR) .................. 10-2005-0119378

(51) Int. Cl.
*H01M 2/02* (2006.01)
(52) U.S. Cl. ................ 429/34; 429/35; 429/38; 429/30; 429/40; 427/115
(58) Field of Classification Search .................... 429/34, 429/35, 38, 39, 30, 32, 40, 44; 427/115
See application file for complete search history.

(56) References Cited

U.S. PATENT DOCUMENTS

| | | | |
|---|---|---|---|
| 4,874,678 A | 10/1989 | Reichner | |
| 6,207,311 B1 | 3/2001 | Baozhen et al. | |
| 6,248,468 B1 | 6/2001 | Ruka et al. | |
| 6,416,897 B1 | 7/2002 | Tomlins et al. | |
| 6,429,051 B1 | 8/2002 | Wood et al. | |
| 7,638,226 B2 * | 12/2009 | Ellwood et al. | 429/40 |
| 2002/0155335 A1 | 10/2002 | Kearl | |
| 2004/0043273 A1 * | 3/2004 | Jankowksi et al. | 429/33 |
| 2004/0072057 A1 | 4/2004 | Beatty et al. | |
| 2004/0115507 A1 * | 6/2004 | Potter et al. | 429/34 |

FOREIGN PATENT DOCUMENTS

| | | |
|---|---|---|
| EP | 1 261 059 A2 | 11/2002 |
| EP | 1 416 568 A2 | 5/2004 |
| JP | 1-169878 | 7/1989 |
| JP | 05036417 | 2/1993 |
| JP | 07-094196 | 4/1995 |
| JP | 2000021425 | 1/2000 |
| JP | 2004-247085 | 9/2004 |
| JP | 2004-253279 | 9/2004 |
| JP | 2004-281094 | 10/2004 |
| JP | 2005-100819 | 4/2005 |
| JP | 2005-129281 | 5/2005 |
| KR | 10-2005-0021027 | 7/2005 |

* cited by examiner

*Primary Examiner* — Raymond Alejandro
(74) *Attorney, Agent, or Firm* — McDermott Will & Emery LLP (57) ABSTRACT

A solid oxide fuel cell module of the invention, a fuel cell using the same and a manufacturing method thereof are provided. The solid oxide fuel cell module is easily manufacturable, economical, easily sealable and high in current density. A support is made of a first catalytic material. A first fluid flow part has flow passages formed inside the support. A second fluid flow part has a plurality of pillars protruded from an outer surface of the support and flow passages formed between the pillars. An electrolyte layer is coated on the outer surface of the support excluding top surfaces of the pillars. A coating layer is made of a second catalytic material and formed on a top surface of the electrolyte layer excluding the pillars. Also, a current collecting layer is coated on the top surfaces of the pillars.

13 Claims, 11 Drawing Sheets

SOLID OXIDE FUEL CELL MODULE, FUEL CELL SYSTEM USING THE SAME AND MANUFACTURING METHOD THEREOF

CLAIM OF PRIORITY

This application claims the benefit of Korean Patent Application No. 2005-119378 filed on Dec. 8, 2005 in the Korean Intellectual Property Office, the disclosure of which is incorporated herein by reference.

BACKGROUND OF THE INVENTION

1. Field of the Invention

The present invention relates to a solid oxide fuel cell and a manufacturing method thereof. More particularly, the present invention relates to a solid oxide fuel cell module which has a unit fuel cell module with an electrode and gas flow passages integral with each other and a plurality of the module stacked vertically and thus is easily manufacturable, economical, easily sealable and high in current density due to no need for a separate gas flow passage layer and a plurality of current collecting boards, a fuel cell system using the same and a manufacturing method thereof.

2. Description of the Related Art

A solid oxide fuel cell (hereinafter, "SOFC") is highlighted as a third-generation fuel cell using a high efficiency low pollution electricity-generation method. The solid oxide fuel cell adopts thermo-chemically stable zirconia as an electrolyte with fuel and air electrodes attached thereto. The solid oxide fuel cell uses fuel gas such as hydrogen, methane or methanol without reformation and employs air or oxygen as an oxidant.

The SOFC utilizes zirconia as an electrolyte and yttria-stabilized zirconia (hereinafter, YSZ) to stabilize its crystalline structure of the electrolyte. This material exhibits an oxygen ion conductivity which is characteristically governed by temperature, and a desired conductivity for the fuel cell is attainable at a temperate of 900° C. to 1000° C. Therefore, the SOFC is typically operable at a temperature of 900° C. to 1000° C. and thus adopts ceramics for an electrode material to withstand such a high temperature. Generally, the fuel cell module is entirely made of ceramics.

However, an ion conductivity of the YSZ electrolyte is at most 0.1 S/cm even at a temperature of 1000° C. Thus, in manufacturing the fuel cell, a poreless and high-density thin film (10 μm to 30 μm) electrolyte layer should be coated to minimize YSZ-induced internal resistance.

A conventional planar SOFC utilizes an electrolyte plate as a support to coat front and back sides of the plate with air electrode and fuel electrode, respectively. In configuring the planar fuel cell module, fuel and air flow passages are formed in an interconnection connecting between the air and fuel electrodes. Such a planar fuel cell module should demonstrate sufficient mechanical strength to ensure the YSZ to serve as the support between the air and fuel electrodes. Notably, 8-YSZ (zirconia having itria added at an amount of 8 mol %) is weak in mechanical strength.

Accordingly, the planar SOFC needs to be thick in the support, i.e., the electrolyte layer. This increases voltage sag caused by internal resistance from inside the electrolyte, deteriorating capability of the fuel cell module. Moreover, the planar SOFC should be sealed in all edge portions thereof to prevent gas mixing in upper and lower parts of the cell.

Conventionally, glass was chiefly used as a sealing material. However, the glass material starts to soften from a temperature of 600° C. and thermal expansion during the subsequent temperature rise imposes strains between the respective fuel cell modules. This increases a risk of gas leakage, potentially damaging the fuel cell modules. Therefore, the glass material for sealing needs to be improved to be commercially viable.

To compensate for lacking mechanical strength of the planar fuel cell, a round tubular cell type is taught in U.S. Pat. Nos. 6,207,311 B1 and 6,248,468 B1.

Such a conventional round tubular cell is slightly inferior to the planar cell structure in terms of current density of a stack itself, but remarkably superior in terms of strength and gas sealing. This structure has air electrode, a solid electrolyte, fuel electrode and a current collecting layer stacked in their order on a porous support tube made of zirconia oxide, thereby forming a unit fuel cell.

Therefore, a gas sealing material is not required to be disposed between electrodes, thereby free from a problem associated with ceramic sealing which arises in the planar cell. Also, the fuel cell itself is of a robust ceramic structure with respective unit cells thereof formed on the secure support. Thus, the fuel cell is superbly resistant to thermal expansion. Moreover a metal interconnection can be employed owing to contact between the unit cells in a reducing atmosphere.

However, one of the fuel cell modules alone fails to boost capacity. The fuel cell modules are connected with each other in series or parallel to form a stack. Yet, the round tubular cell having the fuel cell modules connected with each other as just described, has a current path elongated to allow current generated to flow along a thin electrode surface, thereby potentially raising internal resistance of the entire fuel cell.

In addition, the fuel cell modules 1, when stacked, result in unnecessary spaces inside and outside the round tubular cell, thereby restricting current density per volume.

Recently, to overcome problems with the planar cell and round tubular cell type SOFCs, the fuel cell modules 1 feature both the planar cell structure and the round tubular cell structure, thereby solving a sealing problem of the planar cell. Furthermore, a flat tube type structure and a stack thereof are being developed to enhance current density as taught in Korean Patent Publication Application No. 10-2005-0021027, U.S. Pat. Nos. 6,416,897, and 6,429,051.

But the flat tube type structure, when stacked, also necessitates an electrical interconnection material for electrical and gas flow passages to enable flow of gases to the air or fuel electrodes. This increases mechanical strength of the stack and enlarges a contact area between the fuel cell modules to boost current density. Nonetheless, the metal interconnection characteristically may suffer thermal stress due to difference in thermal expansion with the ceramic fuel cell module when operating at a high temperature. Moreover, the need for using an interconnection material that has a good stability for thermal and electrical properties even during long operation at a high temperature increases price and also volume and weight of the stack.

SUMMARY OF THE INVENTION

The present invention has been made to solve the foregoing problems of the prior art and it is therefore an object according to certain embodiments of the present invention is to provide a solid oxide fuel cell module which is easily manufacturable, easily sealable, and high in current density, a fuel cell system using the same and a manufacturing method thereof.

Another object according to certain embodiments of the invention is to provide a solid oxide fuel cell module which obviates a need for a separate gas flow passage layer or a current collecting layer for electrical connection and thus is simple-structured, easily manufacturable, convenient and mass-producible, a fuel cell system using the same and a manufacturing method thereof.

Further another object according to certain embodiments of the invention is to provide a solid oxide fuel cell module which is considerably reduced in manufacturing costs and noticeably increased in current density due to small internal resistance of an electrode and can be manufactured in large size and large capacity, a fuel cell system using the same and a manufacturing method thereof.

According to an aspect of the invention for realizing the object, there is provided a solid oxide fuel cell module for generating electricity using fuel gas and air, including a support made of a first catalytic material; a first fluid flow part having flow passages formed inside the support; a second fluid flow part having a plurality of pillars protruded from an outer surface of the support and flow passages formed between the pillars; an electrolyte layer coated on the outer surface of the support excluding top surfaces of the pillars; a coating layer made of a second catalytic material and formed on a top surface of the electrolyte layer excluding the pillars; and a current collecting layer coated on the top surfaces of the pillars.

According to another aspect of the invention for realizing the object, there is provided a solid oxide fuel cell system for generating electricity using fuel gas and air, including a hollow casing; a plurality of fuel cell modules stacked inside the casing, each of the fuel cell modules including a support made of a first catalytic material, a first fluid flow part formed inside the support, a second fluid flow part formed in an exterior of the support, and including an electrolyte layer, a coating layer of a second catalytic material and a current collecting layer formed on an outer surface of the support; a first fluid supply part having chambers connected to the fuel cell modules to supply a first fluid to the first fluid flow part of the fuel cell modules; a second fluid supply part having chambers connected to the fuel cell modules to supply a second fluid to the second fluid part; wherein the first fluid is one of fuel gas and air, and the second fluid is the other one of fuel gas and air.

Preferably, according to further another aspect of the invention for realizing the object, there is provided a method for manufacturing an solid oxide fuel cell module comprising steps of:

preparing a support made of an inert or a first catalytic material and having flow passages of a first fluid flow part therein;

forming a plurality of pillars on an outer surface of the support and flow passages of a second fluid flow part between the pillars;

coating an electrolyte layer on the outer surface of the first catalytic support excluding top surfaces of the pillars;

forming a coating layer of a second catalytic material on a top surface of the electrolyte layer excluding the pillars; and coating a current collecting layer on the top surfaces of the pillars.

In the solid oxide fuel cell module, the support has a plurality of partition walls therein to form a plurality of the flow passages, and the plurality of pillars on a top surface thereof, the module further comprising a plurality of the support stacked to form the flow passages between the pillars. Here, the support has an elongated rectangular cross-section.

The support is easily prepared by extrusion-molding and sintering an anode or cathode-forming catalytic material in an extrusion machine.

The support is provided with a thin coat thereon, the thin coat including the electrolyte layer, the coating layer made of a catalytic material having an opposite polarity to the support and a metallic material of the current collecting layer.

In the solid oxide fuel cell module, a plurality of fuel cell modules are stacked inside the casing, each of the fuel cell modules including a support made of a first catalytic material, a first fluid flow part formed inside the support, a second fluid flow part formed in an exterior of the support, and including an electrolyte layer, a coating layer of a second catalytic material and a current collecting layer formed on an outer surface of the support. Here, the first fluid part and the second fluid part of the stacked fuel cell modules are disposed to cross each other to enable gas flow.

Also, in the solid oxide fuel cell module of the invention, the first fluid flow part having the flow passages formed between the partition walls inside serves as a gas flow passage for air or fuel electrode. Meanwhile the second fluid flow part having flow passages formed between the pillars on a top surface of the support serves as a gas flow passage for the opposite electrode when the fuel cell modules are stacked. This obviates a need for a separate gas flow passage and enables thin coating of the current collecting layer, thereby easily manufacturing a stack of the fuel cell modules that is less sensitive to thermal stress.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 1:
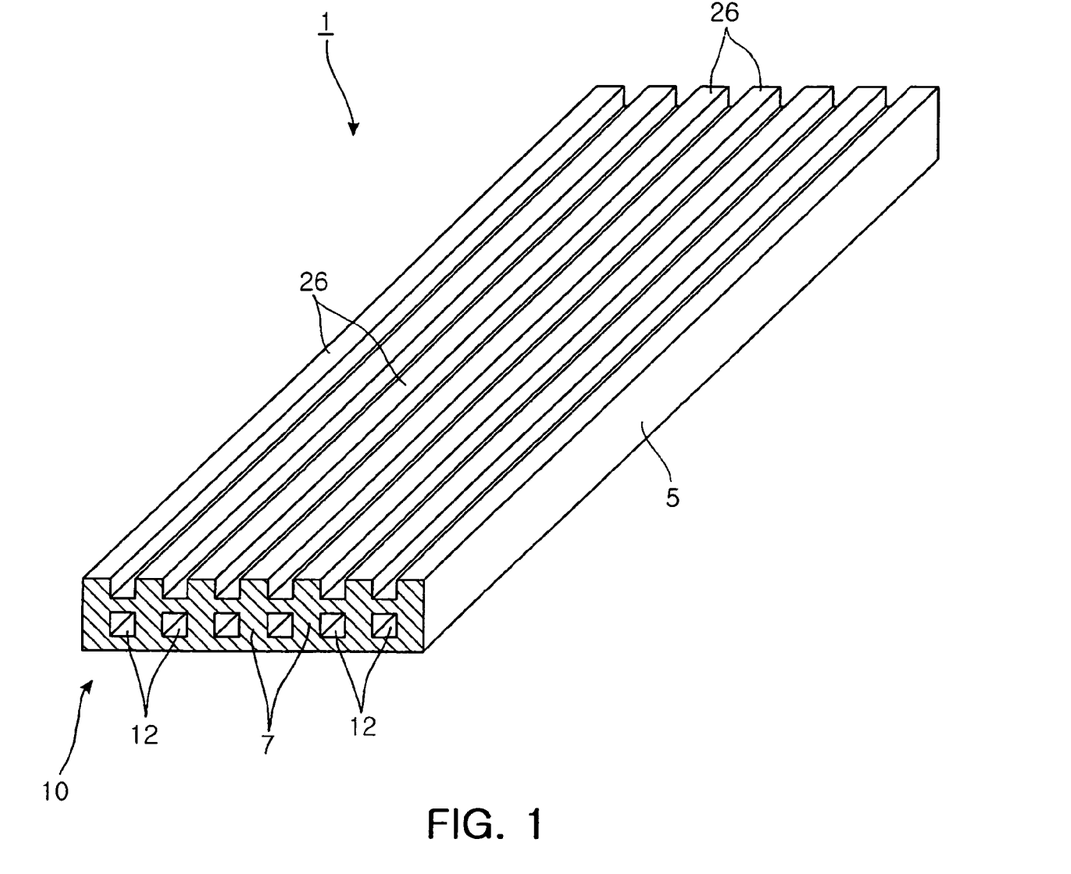
FIG. 1 is a perspective view illustrating a support for manufacturing a solid oxide fuel cell module according to the invention.
Figure 2:
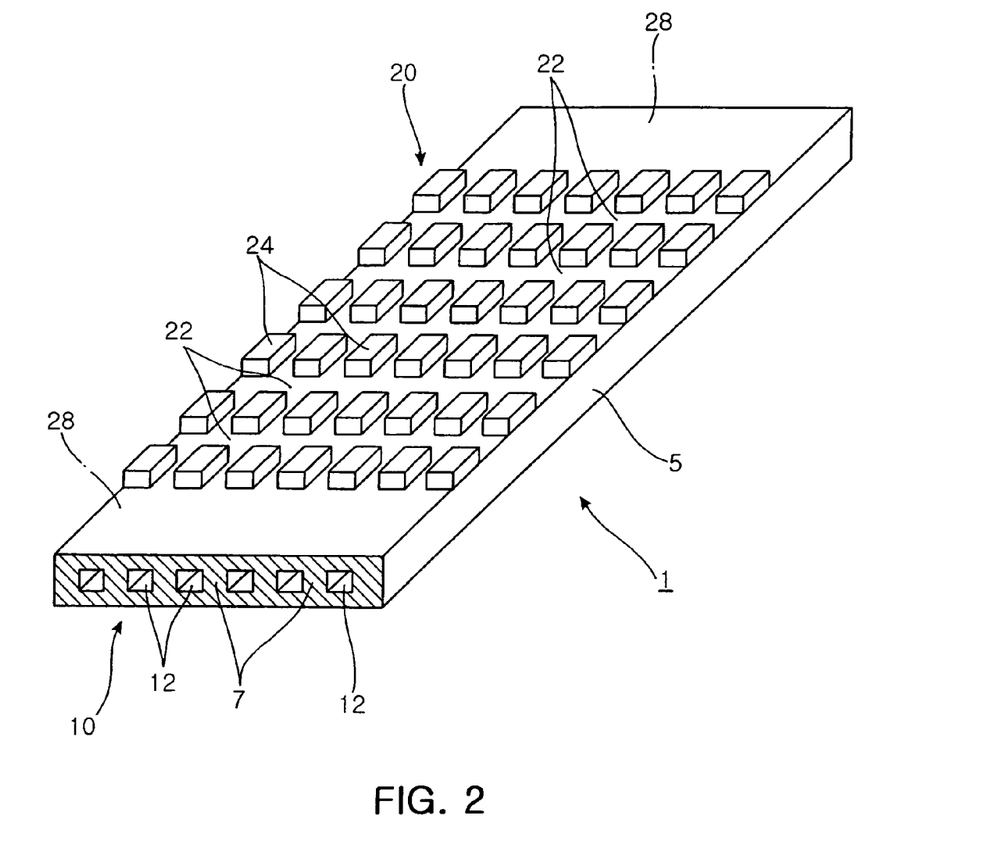
FIG. 2 is a perspective view illustrating a support having square pillars formed on a top surface thereof to manufacture a solid oxide fuel cell module.

A solid oxide fuel cell module 1 of the invention includes a support 5 made of a first catalytic material. As shown in FIGS. 1 and 2, the support 5 belongs to a structure of the fuel cell. The support 5 is extrusion molded with air electrode (anode) or fuel electrode (cathode)-forming catalytic material.

For a catalytic material, the air electrode (anode) adopts e.g., LSM(LaSrMnO$_3$) while the fuel electrode (cathode) uses e.g., Ni/YSZ(cermet). Here, YSZ is yttria-stabilized zirconia.

The catalytic material for the air and fuel electrodes is illustrative of but not limitative of the invention and may be varied.

The support 5 has a plurality of partition walls 7 therein to form a plurality of flow passages 12, thereby forming a first fluid flow part 10. The support 5 made of the catalytic material of air electrode allows air to flow in the flow passages 12 of the first fluid flow part 10, while the support 5 made of the catalytic material of fuel electrode allows fuel gas to flow in the flow passages 12 of the first fluid flow part 10.

The flow passages 12 of the support body 5 are honeycomb-shaped but can be modified in their shape as long as gas can flow uniformly therein. Preferably, the gas flow passages 12 are regular square or rectangular. Also, the gas flow passages 12 each have an inner diameter of 0.1 mm to 10 mm, more preferably, 1 mm to 3 mm and the partition walls 7 between the flow passage 12 each have a thickness of 0.1 mm to 5 mm, more preferably, 1 mm to 3 mm.

The flow passages 12 of the first fluid part flow 10 formed inside the support 5 has a regular square or rectangular cross-section as just described. But the invention is not limited thereto. That is, the flow passages 12 of the first fluid part flow 10 may be modified in their shape if the support 5 is long tube-shaped and has the gas flow passages 12 of the first fluid flow part 10 are formed therein. The invention includes various configurations of the flow passages 12 of the first fluid flow part 10.

As shown in FIG. 2, the support 5 includes a second fluid flow part 20 having a plurality of pillars 24 protruded from an outer surface thereof and flow passages 22 formed between the pillars 24. To form the pillars 24 for forming the second fluid flow part 20, as shown in FIG. 2, elongated protrusions 26 on the top surface of the support 5 can be polished and removed properly.

The pillars 24 act as an electrical interconnection for electrically connecting an overlying fuel cell module 1 when a plurality of the support 5 is stacked. Also, the pillars 24 constitute the flow passages 22 of the second fluid flow part 20 to ensure fuel to be supplied to between the pillars 24.

Meanwhile, the support 5 has the pillars 24 intensively populated in a central portion of the top surface thereof, leaving pillarless areas 28 at opposite edges thereof.

The pillars 24 each have a height of 0.1 mm to 10 mm and a width of 0.1 mm to 10 mm, preferably 1 mm to 3 mm, and 1 mm to 3 mm, respectively. The pillars 24 are spaced apart from each other at a distance of 0.1 mm to 10 mm, preferably 1 mm to 5 mm.

As shown in FIG. 2, the pillarless areas 28 at the opposite edges of the top surface of the support 5 are located outside a heater of a fuel cell system 100 described later.

Figure 3:
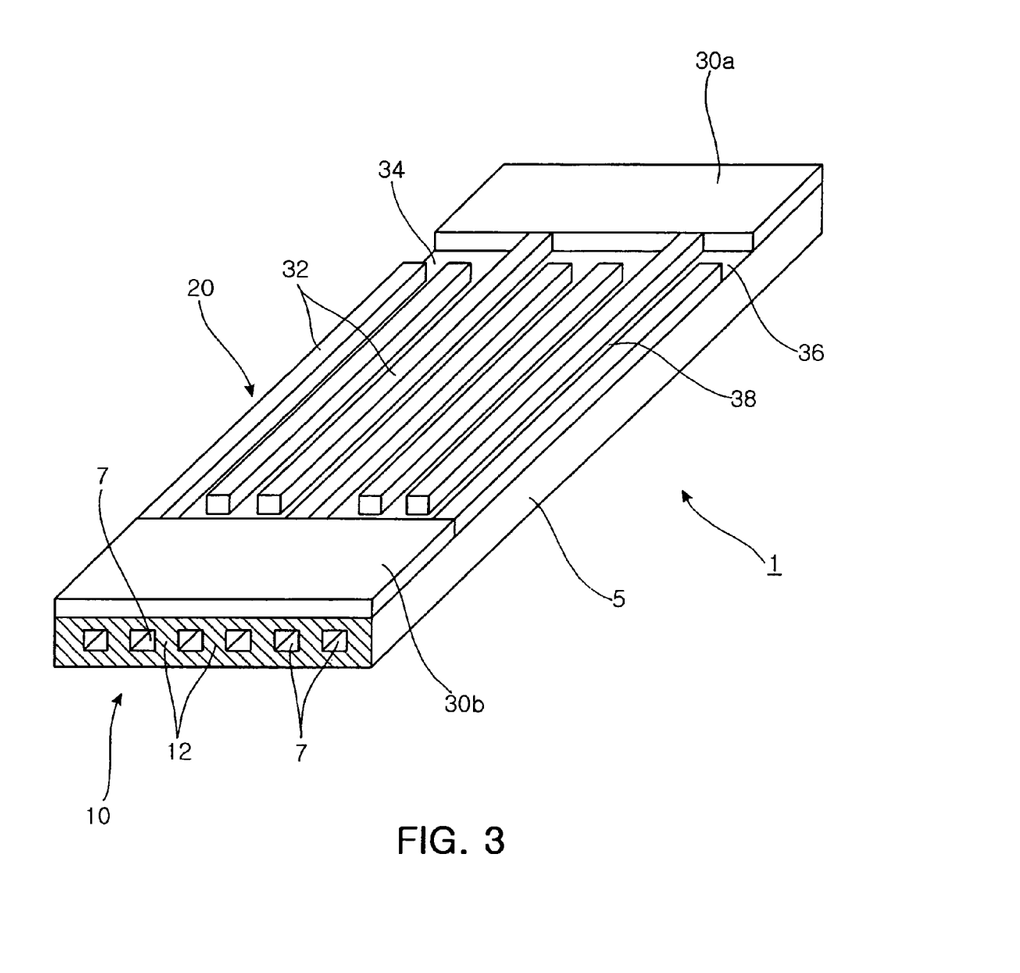
FIG. 3 is a perspective view illustrating a support having elongated pillars formed on a top surface thereof to manufacture a solid oxide fuel cell module according to the invention.

The pillarless areas 28 at the opposite edges of the support 5 facilitate gas sealing and gas supply. As shown in FIG. 3, additional sealing materials 30a and 30b may be disposed to seal the sides of gas flowing through the second fluid flow part 20.

When the unit fuel cell module 1 of the support 5 is formed and operated, the pillars 24 of the support 5 generate current electro-chemically by oxidation and reduction in a high temperature furnace, i.e., a heater.

The pillars 24 protruded from the support 5 may be configured as a hexahedron having a square cross-section as shown in FIG. 2. However, the pillars 24 may be altered in shape, size and height as long as the pillars 24 perform their function.

FIG. 3 illustrates a modification of the pillars 24. That is, as shown in FIG. 2, in place of the short pillars 24, a plurality of pillars 32 are elongated in parallel with each other on the top surface of the support 5. The elongated pillars 32 are provided at one side thereof an inflow hole 34 and at the opposite side thereof an exhaust hole 36. The inflow hole 34 and exhaust hole 36 constitute elongated flow passages 38 by the elongated pillars 32.

The elongated flow passages 38 are formed such that a direction from the inflow hole 34 to the exhaust hole 36 is perpendicular to a flow direction of the flow passages 12 of the first fluid flow part 10.

The elongated pillars 32 differ from the shorter pillars 24 described in FIG. 2 only in terms of shape but function identically. Now the shorter pillars 24 will be explained in greater detail. But the details described are applicable to the elongated pillars 32.

The solid oxide fuel cell module of the invention includes an electrolyte layer 40 coated on an outer surface of the support 5 excluding top surfaces of the pillars 24.

Figure 4:
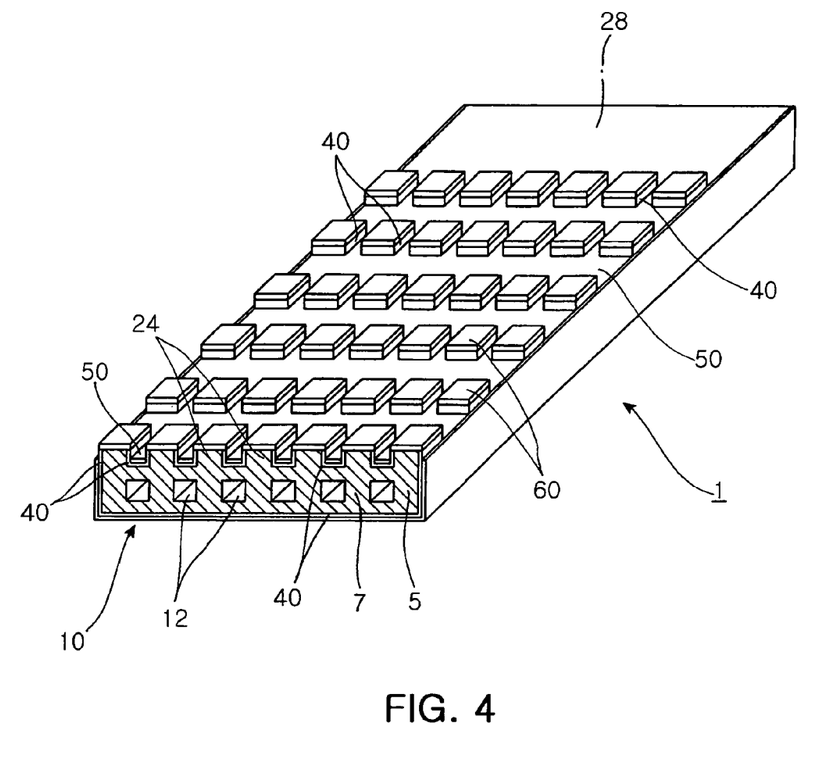
FIG. 4 is a perspective view illustrating a solid oxide fuel cell module according to the invention.
Figure 5:
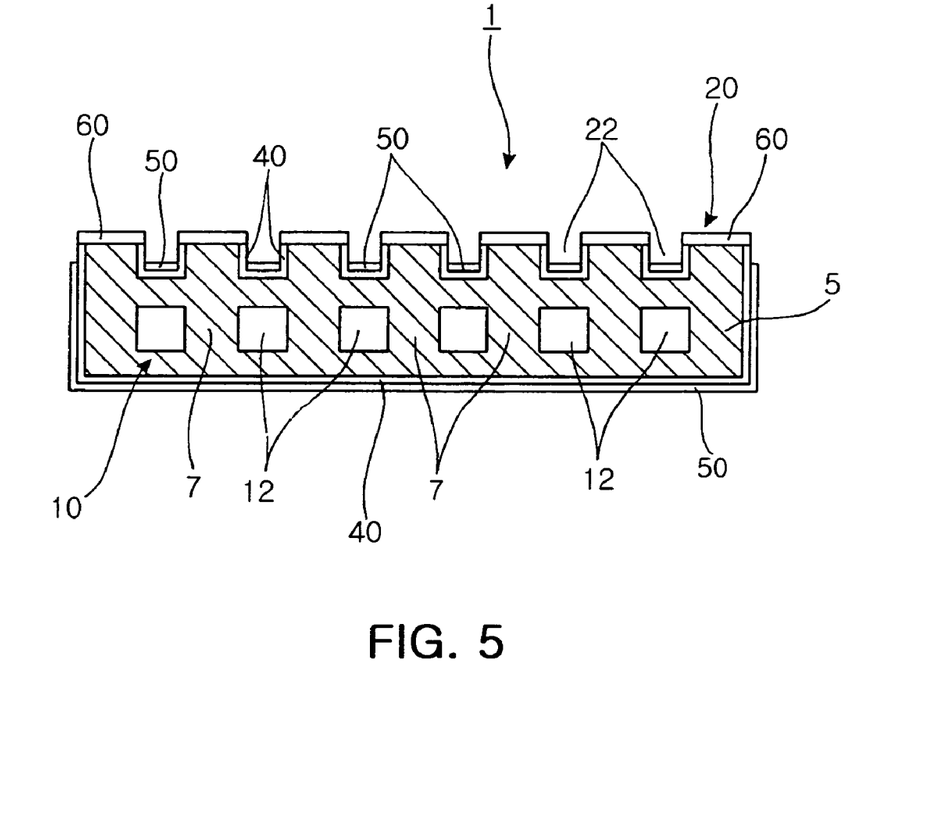
FIG. 5 is a cross-sectional view illustrating a solid oxide fuel cell module according to the invention.

As described above, according to the invention, after the support 5 is completed, yttria-stabilized zirconia (YSZ) constituting the electrolyte layer 40 of the fuel cell system 100 is uniformly coated on the outer surface of the support 5, as shown in FIGS. 4 and 5. Here, the electrolyte layer 40 is thoroughly coated on the outer surface of the support 5 excluding the top surface of the pillars 24 which serves as an electrical path.

Furthermore, a coating layer 50 made of a second catalytic material is formed on a top surface of the electrolyte layer 40 excluding the pillars 24. The coating layer 50 is made of a catalytic material having an opposite polarity to the catalytic material of the support 5. The coating layer 50 is coated on an outer surface of the electrolyte layer 40 excluding the top surfaces and some side portions of the pillars 24.

That is, if the support 5 is made of a catalytic material of air electrode, the coating layer 50 is made of a catalytic material of fuel electrode. Likewise, if the support 5 is made of a catalytic material of fuel electrode, the coating layer 50 is made of a catalytic material of air electrode.

Moreover, according to the invention, a current collecting layer 60 is coated on the top surfaces of the pillars 24. The current collecting layer 60 is thoroughly coated on the top surfaces of the pillars 24 as thinly as possible so that gas is not leaked. The current collecting layer 60 is an area for coating interconnections necessary for stacking a plurality of the fuel cell module 1.

Therefore, the current collecting layer 60 is coated with metal particles and then thermally sintered. Optionally the current collecting layer 60 is coated via chemical vapor deposition (CVD) using metal compounds. Here the current collecting layer 60 is connected to the electrolyte layer 40 and is thoroughly coated to prevent gas from leaking between the electrolyte layer 40 and the current collecting layer 60.

A material for the current collecting layer 60 is electrically conductive and thermally stabilizing for a long time at an operating temperature of the fuel cell system 100. Also, the material for the current collecting layer 60 is not gas permeable, thereby facilitating stacking of the plurality of fuel cell modules 1.

Moreover, the material for the current collecting layer 60 can be varied irrespective of composition thereof as long as the material assures the stacking as just described.

Also, the electrolyte layer 40, coating layer 50, and current collecting layer 60 each have a thickness up to 1000 μm, more preferably up to 200 μm.

The electrolyte layer 40 and the current collecting layer 60 do not abut or overlap each other such that different types of two gases, i.e., air and fuel gas do not mix together. Furthermore, the current collecting layer 50 and the coating layer 60, when coated, do not abut each other to be electrically insulated.

Figure 6:
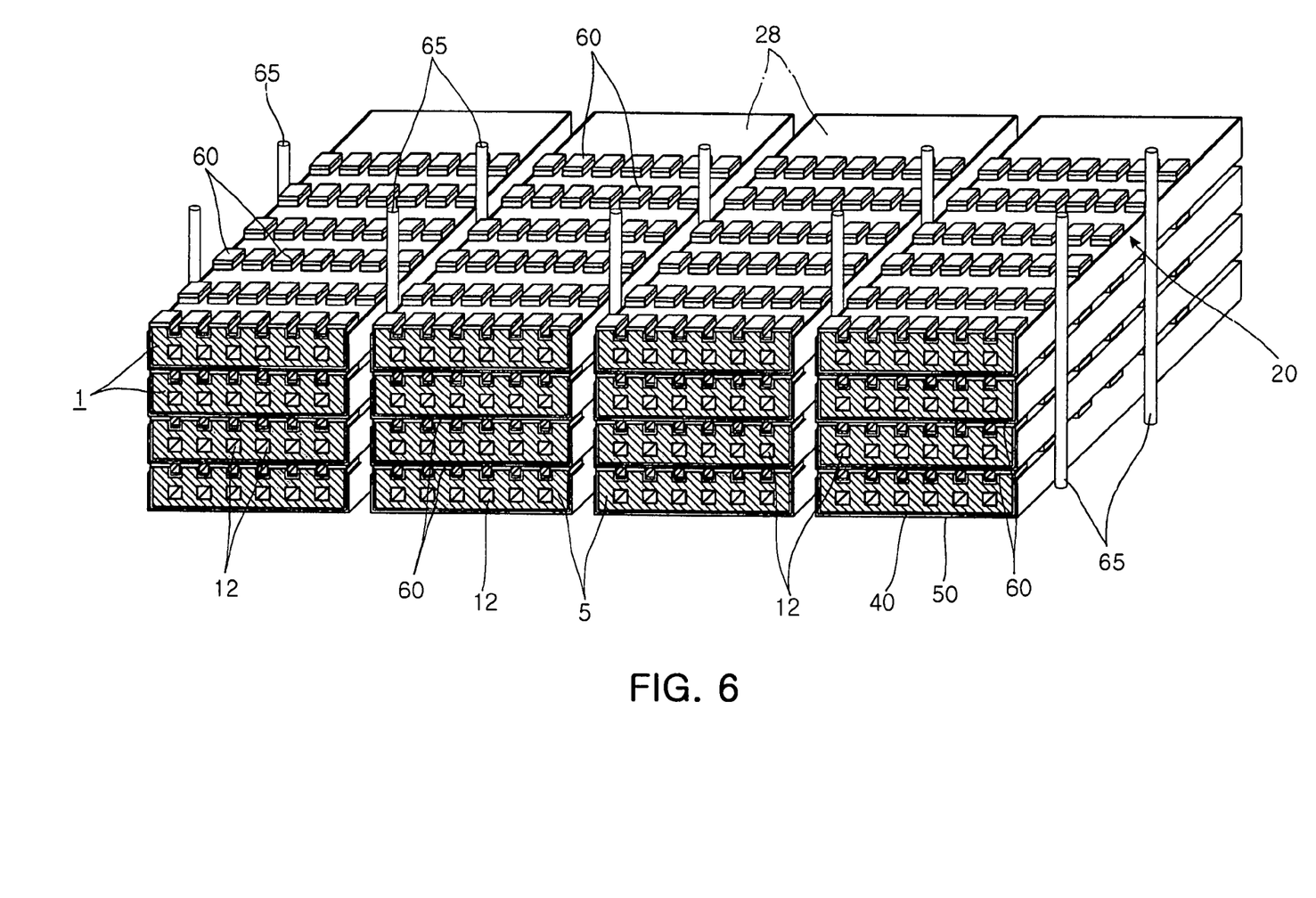
FIG. 6 is a perspective view illustrating a stack of solid oxide fuel cell modules according to the invention.

Meanwhile, the fuel cell module 1 of the invention, as shown in FIG. 6, features a stack structure with a stack bundle to form the fuel cell. In the structure shown in FIG. 6, a plurality of the fuel cell module 1 is arranged in parallel horizontally to form a larger-sized stack.

Support bars 65 located between the stacked fuel cell modules 1 anchor the fuel cell modules 1 stacked vertically from a horizontal direction. Also, the support bars 65 space the fuel cell modules 1 stacked vertically apart from each other horizontally, thereby serving as a spacer to electrically insulate the fuel cell modules 1.

Therefore, such support bars 65 may be made of a material having no electrical conductivity and a mechanical strength at a high temperature. The support bars 65 may be variously configured and composed only if they perform functions as just described.

The solid oxide fuel cell system 100 having the fuel cell modules 1 stacked therein according to the invention generates electricity using fuel gas and air.

The solid oxide fuel cell system 100 of the invention includes a hollow casing 105. A shown in FIG. 7, the hollow casing 105 includes a first cover surrounding a central portion of the stacked fuel cell modules where the pillars 24 are formed to shield the central portion from the outside, and second and third covers 120a and 120b surrounding end portions of the fuel cell modules 1 at both sides of the first cover to shield the end portions from the outside.

Figure 7:
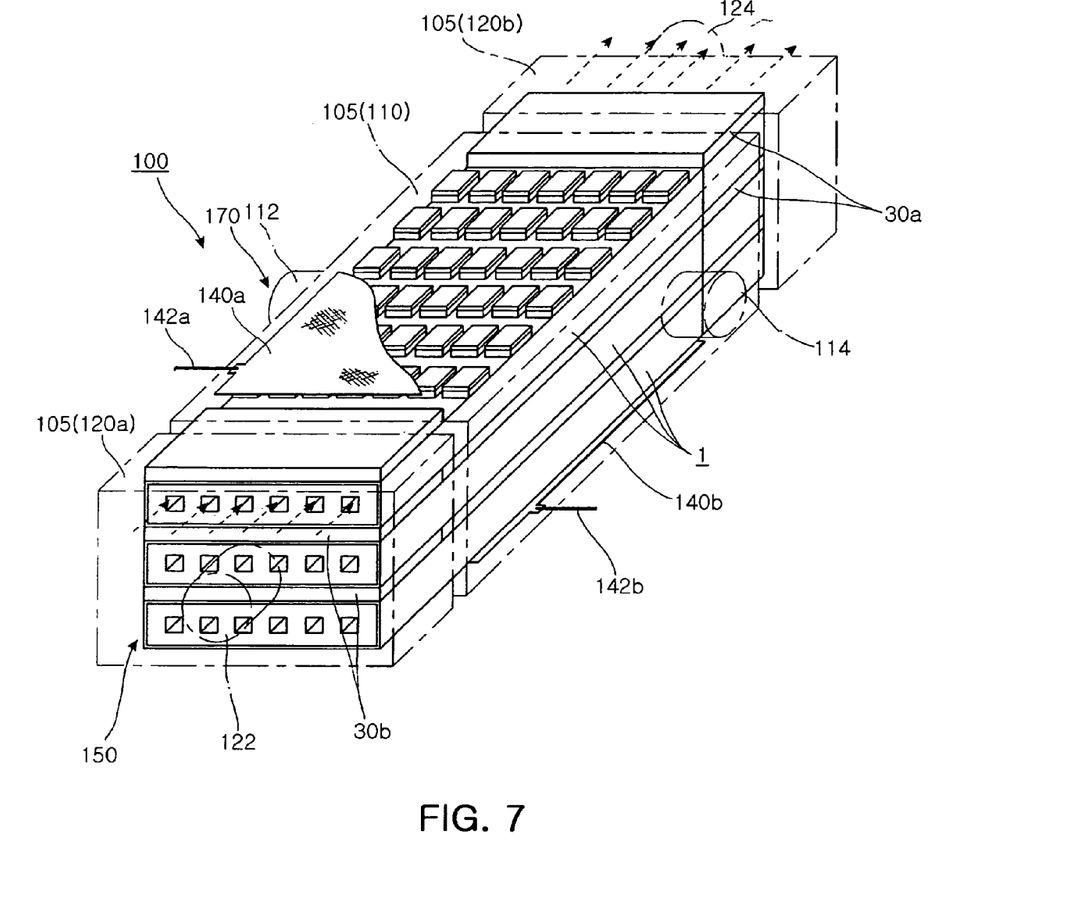
FIG. 7 is a partially broken perspective view illustrating a solid oxide fuel cell according to the invention.

The first cover 110 has both sides located at the sealing materials 30a and 30b of the fuel cell modules 1. The first cover 110 is provided at one side thereof with an entrance 112 to supply fuel gas or air to the second fluid flow part 20 and at an opposite side thereof with an exit 114.

Also, the second cover 120a and the third cover 120b are configured as a sealing structure for surrounding end portions of the fuel cell modules 1. Here, one of the second and third covers 120a and 120b is provided with an entrance 122 to supply air or fuel gas to the first fluid flow part 10 of fuel cell modules 1 and the other one of the second and third covers 120a and 120b is provided with an exit 124.

Each of the fuel cell modules 1 stacked inside the casing includes a support 5 made of a first catalytic material, a first fluid flow part 10 formed inside the support 5, a second fluid flow part 20 formed in an exterior of the support 5, and includes an electrolyte layer 40, a coating layer 50 and a current collecting layer 60 formed on an outer surface of the support 5.

The fuel cell modules 1 stacked inside the casing 105 include current collecting boards 140a and 140b disposed on top and underside surfaces of the casing to collect current from the fuel cell modules 1. An upper current collecting board 140a is electrically connected to the current collecting layer 60 of an uppermost one of the fuel cell modules 1. Meanwhile, a lower current collecting board 140b is electrically connected to the coating layer 50 of a lowermost one of the fuel cell modules 1. The current collecting boards 140a and 140b extract direct current to outside through lines.

Figure 9:
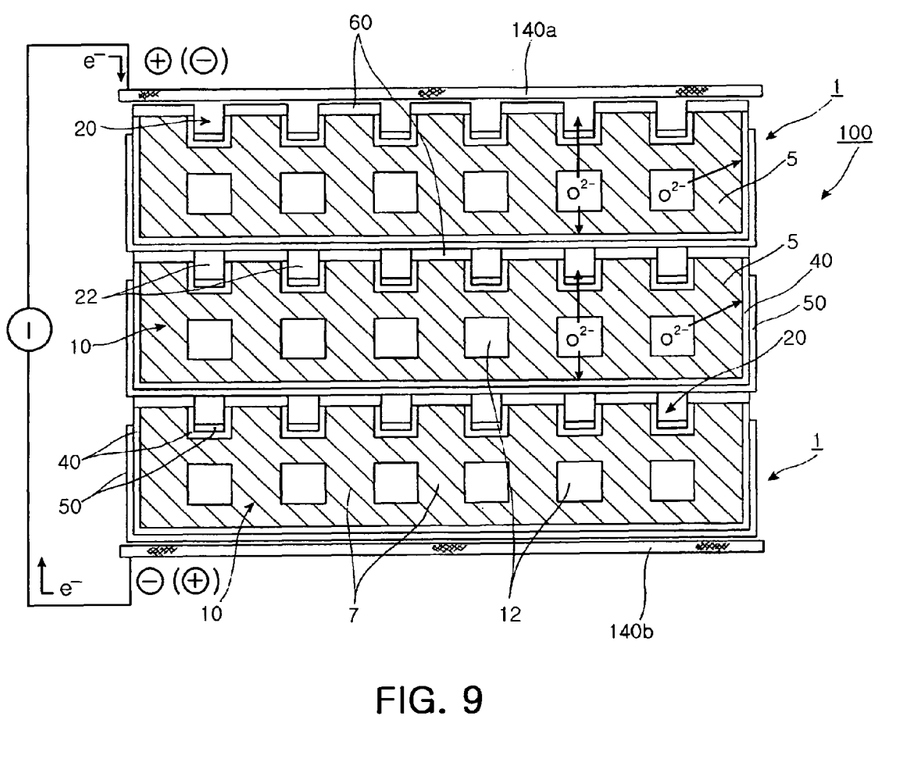
FIG. 9 is a cross-sectional view illustrating a solid oxide fuel cell according to the invention.

Also, the solid oxide fuel cell system 100 of the invention includes a first fluid supply part 150 having chambers connected to the fuel cell modules to supply a first fluid to the first fluid flow part 10 of the fuel cell modules 1. As shown in FIG. 9, the first fluid supply part 150 includes the second and third covers 120a and 120b disposed at both sides of the stacked fuel cell modules 1.

Such a first fluid supply part 150 is configured as a sealing structure such that the second and third covers 120a and 120b constituting a portion of the casing 105 surround end portions of the fuel cell modules 1 in which the chambers inside communicate with each other through the first fluid flow parts of the fuel cell modules 1.

Figure 8:
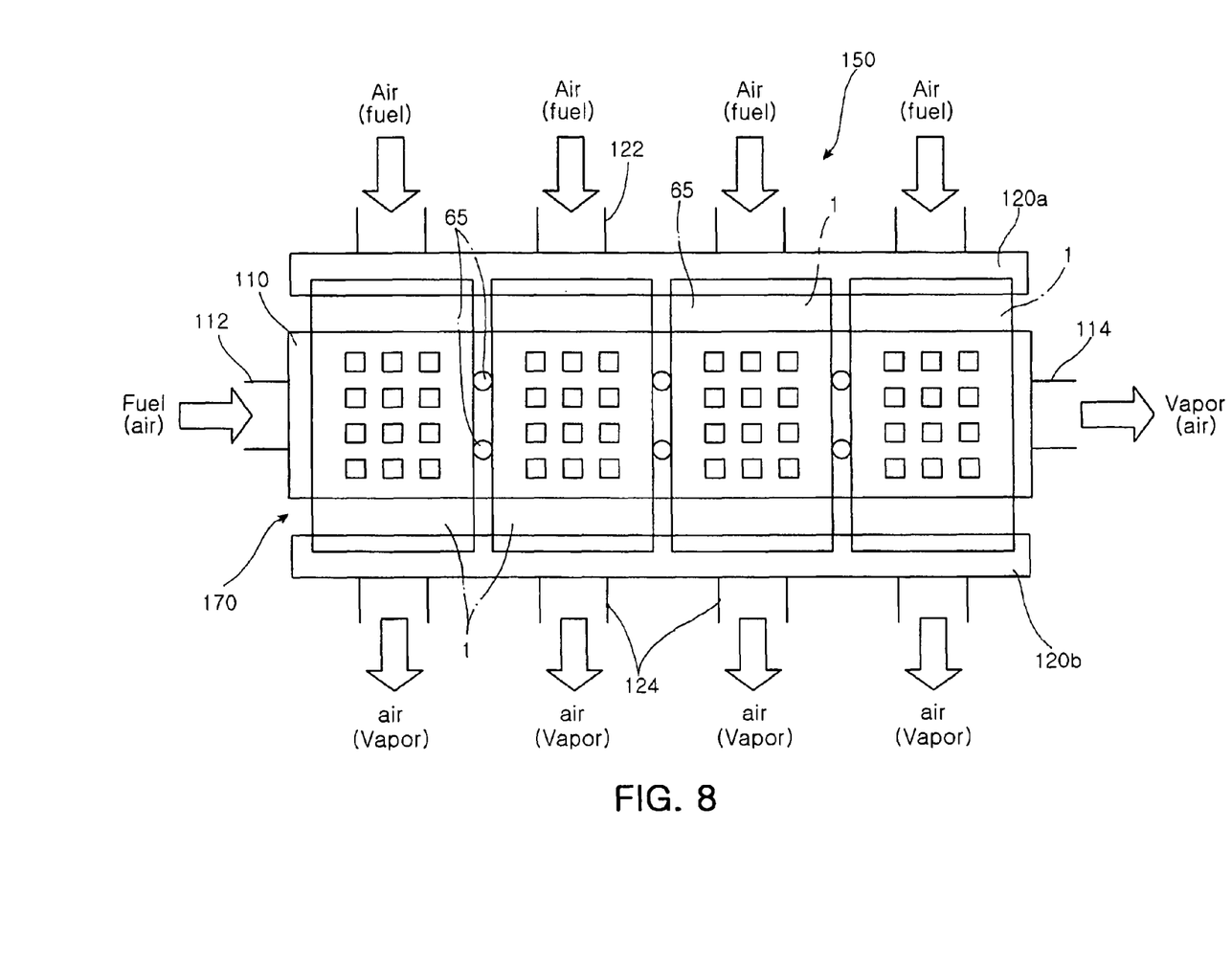
FIG. 8 is an explanatory view illustrating operation principle of a solid oxide fuel cell according to the invention.

Therefore, one of the second and third covers 120a and 120b is provided with an entrance 122 to supply air or fuel gas to the inside chambers and the other one of the second and third covers 120a and 120b is provided with an exit. As shown in FIG. 8, if the second cover 120a is provided with the entrance 122 for the first fluid flow part 150, the first fluid, i.e., air or fuel gas flows from the entrance of the second cover 120a to the exit 124 of the third cover 120b through the first fluid flow parts 10 of the stacked fuel cell modules 1. On the contrary, if the third cover 120b is provided with the entrance for the first fluid supply part 150, the first liquid, i.e., air or fuel gas flows from the third cover 120b toward the second cover 120a.

Here, in a case where the first fluid is air, the second fluid is fuel gas, and vice versa.

The solid oxide fuel cell system 100 of the invention includes a second fluid supply part 170 having chambers connected to the fuel cell modules 1 for supplying the second fluid to the second fluid flow parts 20 of the fuel cell modules 1.

As shown in FIG. 7, the second fluid flow part 170 includes a first cover 110 which surrounds a central portion of the stacked fuel cell modules 1 where the pillars 24 are formed to shield the central portion from the outside.

The first cover 110 of the second fluid flow part 170 constitutes a portion of the casing 105 and has both sides located at the sealing materials 30a and 30b of the fuel cell modules 1. The first cover 110 is provided with one side thereof with an entrance 112 to supply fuel gas or air to the second fluid flow part 20 of the stacked fuel cell modules and at an opposite side thereof with the exit 114.

The second fluid supply part 170 as just described is configured as a sealing structure such that the first cover 110 surrounds the pillars 24 of the stacked fuel cell modules 1 in which chambers at the entrance 112 and exit 114 communicate with each other through the second fluid flow part 20 of the stacked fuel cell modules 1.

Therefore, if fuel gas or air is induced to the chambers at the entrance 112, the second fluid, i.e., fuel gas or air flows toward the exit 114 through the second fluid flow part 20 of the stacked fuel cell modules 1.

Here, in a case where the second fluid is air, the first fluid is fuel gas, and vice versa.

In this process, the chamber at the entrance 11 of the first fluid supply part 150 and the chambers at the entrance of the second fluid supply part 122 serve as a distribution area for supplying and exhausting air or fuel gas uniformly through the first fluid flow part 10 and the second fluid flow part 20, respectively.

Furthermore, the invention includes a heater 180 for heating the fuel cell modules 1 to a reaction temperature. The heater 180 has its heat source located on an outer periphery of the first cover 110 of the casing 105 and heats an internal space thereof to a reaction temperature of 1000° C. through the first cover 110.

To obtain the fuel cell system 100 of the invention configured as described above, a fuel cell module 1 of the invention should be manufactured.

First, to manufacture the fuel cell module 1 according to the invention, a support 5 made of a first catalytic material and having flow passages 12 of a first fluid flow part 10 therein is prepared.

To this end, a plurality of partition walls 7 are formed inside an elongated rectangular flat tube to form a first fluid part 10 having the flow passages 12 shaped as a honeycomb. Then, as shown in FIG. 1, protrusions 26 with uniform width and height are formed in parallel along a length direction on an outer surface of the support 5.

This protuberant type of support 5 is easily manufacturable via extrusion-molding or sintering using a typical extruder.

Next, according to the invention, the protrusions 5 of the support 5 are machined to form a plurality of pillars 24 and flow passages 22 of a second fluid flow part 20 between the pillars 24.

For this purpose, both side ends of the protrusions 26 are removed to a predetermined length along a length direction to form a flat portion or an area 28 where sealing materials 30a and 30b are located. Then the sealing materials 30a and 30b are attached to form a gas sealing part. Also, the protrusions 26 in a central portion of the support 5 are removed with a predetermined pattern to form the second fluid flow part 20 therebetween. A second fluid flowing through the second fluid flow part 20 is induced perpendicularly, i.e., at a right angle with respect to a first fluid flowing through the first fluid flow part 10. This fundamentally inhibits the first and second fluids from being mixed together.

Subsequently, an electrolyte layer 40 is coated on an outer surface of the support excluding top surfaces of the pillars 24. The electrolyte layer 40 is coated and sintered on the entire outer surface excluding the top surfaces of the pillars 24.

Afterwards, a coating layer 50 of a second catalytic material is formed on a top surface of the electrolyte layer 40 excluding the pillars 24. In this process, the catalytic material of an opposite polarity to the support 5 is coated and sintered on an outer surface of the electrolyte layer 40 excluding the top surfaces and some side portions of sides of the pillars 24.

Thereafter, a current collecting layer 60 is coated on the top surfaces of the pillars. To form the current collecting layer 60, a metal material is coated as thinly and thoroughly as possible on the top surfaces of the pillars 24, thereby completing a plurality of a unit fuel cell module 1.

The unit fuel cell modules 1 manufactured feature a unit stack structure, in which constituents are only stacked vertically without further employing a plurality of current collecting metals or the gas flow passages 12. Also, such stacked structures can be disposed in parallel to configure a large-capacity fuel cell system 100.

Figure 10:
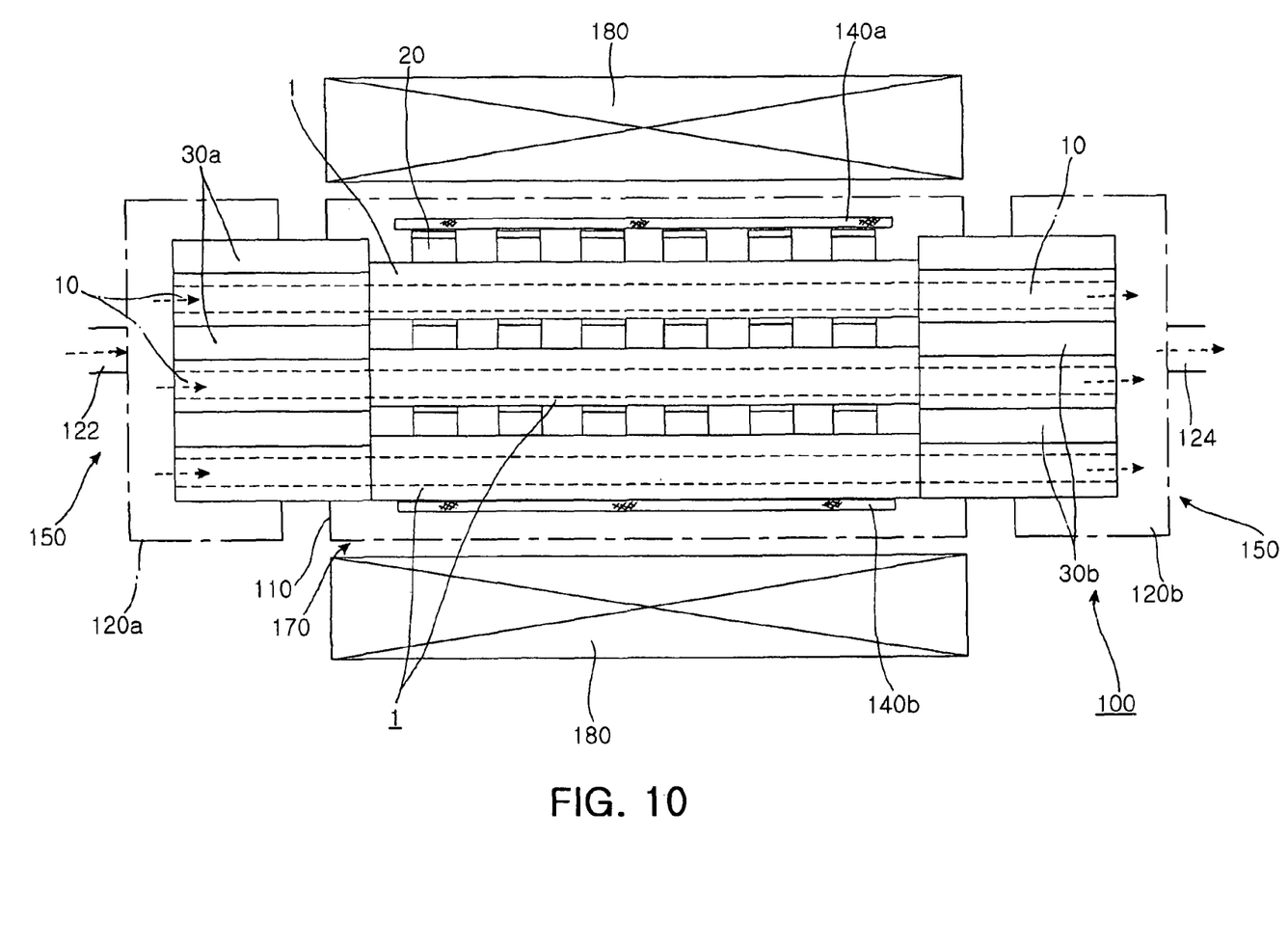
FIG. 10 is a cross-sectional view illustrating a solid oxide fuel cell according to the invention.
Figure 11:
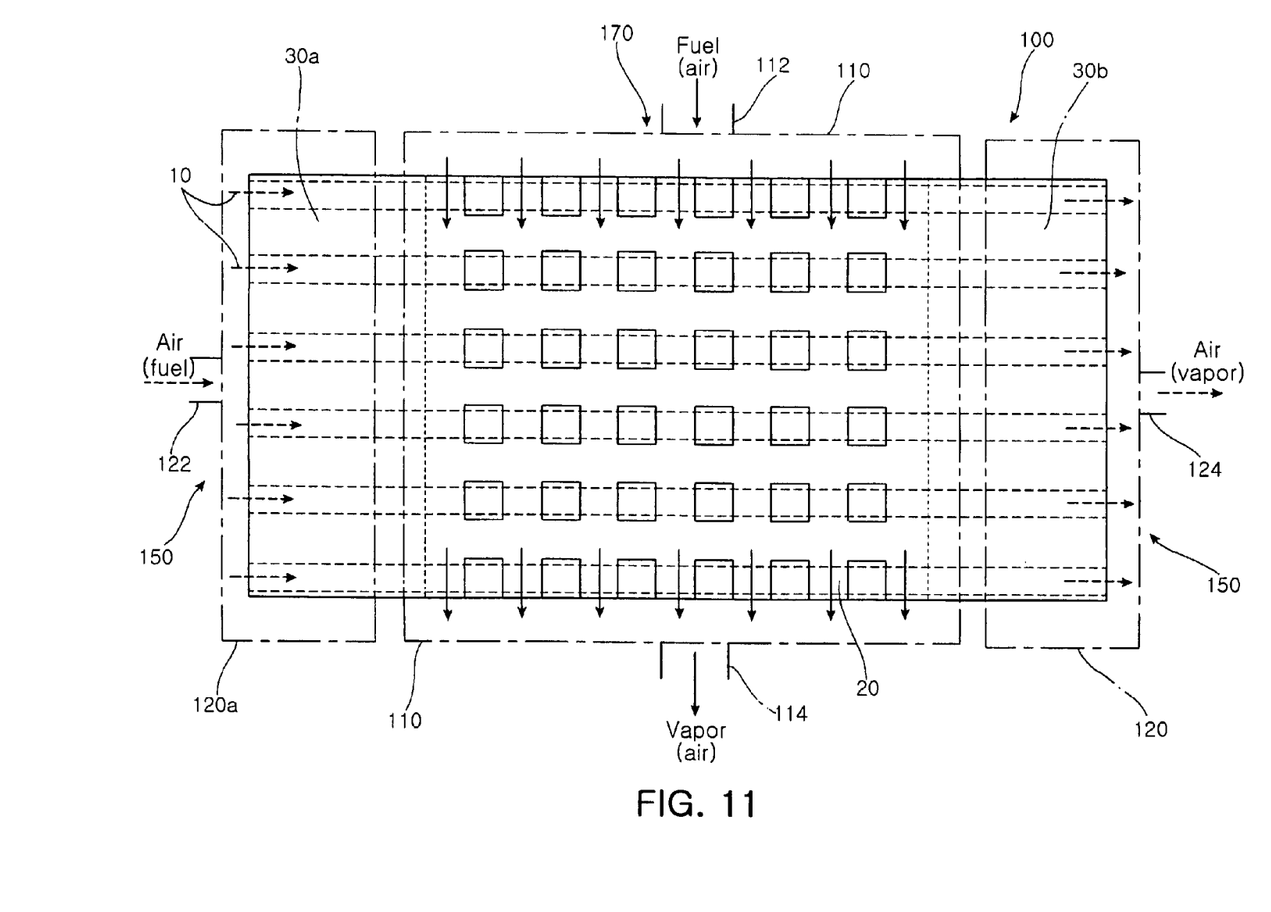
FIG. 11 is a cross-sectional view illustrating a solid oxide fuel cell according to the invention.

As shown in FIGS. 10 and 11; the fuel cell module 1 and the fuel cell system 100 according to the invention have the first fluid supplied through the first fluid supply part 150 and the second fluid supplied through the second fluid supply part 170. Here the first fluid is supplied perpendicularly to the second fluid.

The first fluid induced through the first fluid supply part 150 is one of air and fuel gas. In a case where the first fluid is air, the support 5 forms an air electrode or anode and is made of a catalytic material having a formula of LSM ($LaSrMnO_3$). In a case where the first fluid is fuel gas, the support 5 forms a fuel electrode or cathode and is made of a catalytic material having a formula of Ni/YSZ (cermet).

Also, the second fluid fed through the second fluid supply part 170 is the other one of air and fuel gas. That is, in a case where the first fluid is air, the second fluid is fuel gas, and vice versa. In a case where the second fluid is fuel gas, the coating layer 50 is formed of a catalytic material of fuel electrode or cathode, as exemplified by Ni/YSZ(cermet). Meanwhile, in a case where the second fluid is air, the coating layer 50 is formed of a catalytic material of air electrode or anode, as exemplified by LSM($LaSrMnO_3$).

The solid oxide fuel cell system 100 of the invention needs to be heated to about 1000° C. through a heater 180 to generate electricity. The heater 180 is disposed in an outer periphery of the first cover 110 and heats inside the first cover 110. Here, the first cover 110 acts as a furnace and experiences oxidation and reduction of the fuel cell system 100.

The heater 180 may utilize an electrical resistance coil as a heat source. Alternatively, the heater may adopt direct flame such as a burner as a heat source to heat the first cover 110 from outside. Such heating methods are illustrative of but not limitative of the invention.

The fist cover 10 undergoes chemical reaction therein as follows.

In a case where air flows through the first fluid flow part 10 and fuel gas flows through the second fluid flow part 20, oxygen in the air is dissolved into an oxygen ion $O^{2-}$ and electrons $2e$—due to catalytic reaction of the support 5. Here the oxygen ion alone selectively passes through the solid oxide electrolyte film and the coating layer 50 and is transferred to hydrogen, i.e., the fuel gas of the second fluid flow part 20 to react. The second fluid flow part 20 exhausts vapor and some unreacted fuel gas. At the same time, electrons dissolved from oxygen flow through the upper and lower current collecting layers 60, thereby generating current. In the second fluid flow part 20, heat is incidentally accompanied by the vapor-generating reaction. The current generated is a direct current which may be used to power a direct current motor or may be converted into an alternating current by a current converter.

Such chemical reaction allows current to flow in the current collecting layers 60 disposed in the respective fuel cell modules 1. In the fuel cell modules 1 stacked, electrons move along a vertical stack direction as if cells are connected in series. Thus, direct current can be extracted from the current collecting boards 140a and 140b disposed in upper and lower parts of the stacked fuel cell modules 1.

Here, as shown in FIG. 9, in a case where air flows through the flow passages 12 of the first fluid supply part 150 and fuel gas flows through the second fluid supply part 170, the support 5 serves as air electrode so that the upper current collecting board 140a forms an anode terminal and the lower current collecting board 140b forms a cathode terminal.

On the contrary, in a case where fuel gas flows through the flow passages 12 of the first fluid supply part 150, and air flows through the second fluid supply part 170, the support 5 serves as fuel electrode so that the upper current collecting board 140a forms a cathode terminal and the lower current collecting board 140b forms an anode terminal.

Meanwhile, in the solid oxide fuel cell system 100 of the invention, as shown in FIG. 11, when the plurality of the unit fuel cell module 1 are stacked, the second and third covers 120a and 120b of the second fluid supply part 170 are located at both outer sides of the first cover 110 where the heater 180 is installed. The second and third covers 120a and 120b can be maintained at a temperature lower than a high temperature maintained in a reaction area of the first cover 110. As shown in FIG. 10, sealing is carried out by the sealing materials 30a and 30b, thereby realizing better gas sealing than a conventional planar structure.

In the solid oxide fuel cell system 100 of the invention, the first fluid supply part 150 and the second fluid supply part 170 are disposed at a right angle to allow gases to be fed through different sides, thereby completely and effectively blocking the gases from being mixed together. Here, in a case where the first fluid supply part 150 serves as an air supply port, the second fluid supply part 170 serves as a fuel supply port, and vice versa.

Furthermore, air or fuel gas does not need to be supplied separately depending on the flow passages or the unit fuel cell module. In place thereof, gases may be collectively supplied to the first and second flow fluid parts 10 and 20 by using the first, second and third covers 110, 120a and 120b constituting the casing 105, which are configured as a simple box. This ensures the solid oxide fuel cell to be manufactured easily and allows gases to be fed uniformly to the respective fuel cell modules 1, thereby maximizing current generation.

Meanwhile, according to the invention, the first, second and third covers 110, 120a and 120b may be variously shaped if the first, second and third covers 110, 120a and 120b disposed in the first and second fluid supply parts 150 and 170 function to supply air or fuel gas collectively as just described. Here, in a case where the first fluid supply part 150 serves as an sir supply port, the second fluid supply part 170 serves as a fuel supply port, and vice versa.

As set forth above, according to preferred embodiments of the invention, a plurality of a fuel cell module is stacked such that a first fluid flow part is formed therein and a second fluid flow part is formed thereoutside. Thus, gas flow passages formed inside are shaped as a honeycomb, thus structurally rigid, high in current density and as advantageous as a round tubular cell.

These fuel cell modules are stacked vertically and the stacks can be arranged in parallel. Also, the fuel cell modules can be internally configured through a casing. This ensures the fuel cell modules to be easily manufacturable, economical and easily sealable.

Furthermore, according to the invention, current generated can be drawn out using current collecting boards disposed in upper and lower parts of the stacked fuel cell modules without employing a separate gas supply system for supplying fuel or air smoothly or a plurality of current collecting structures for electrical connection. This allows the entire fuel cell system to be simplified in its structure, easily manufactured and used conveniently.

The invention is configured as the stacked fuel cell modules which can be mass-produced and significantly reduced in manufacturing costs, thereby achieving cost-effective production thereof.

In addition, the invention is configured such that the fuel cell modules are stacked, and large-sized current collecting layer and coating layer are disposed in abutment with each other. This reduces internal resistance of electrodes, remarkably increasing current density. Moreover, the support can be expanded in width and length and the stacks of the fuel cell modules can be disposed in parallel, thereby producing the fuel cell system in large size and large capacity without diminishing current density.

While the present invention has been shown and described in connection with the preferred embodiments, it will be apparent to those skilled in the art that modifications and variations can be made without departing from the spirit and scope of the invention as defined by the appended claims.

What is claimed is:

1. A solid oxide fuel cell module for generating electricity using fuel gas and air, comprising:
   a support made of a first catalytic material;
   a first fluid flow part having flow passages formed inside the support;
   a second fluid flow part having a plurality of pillars protruded from an outer surface of the support and flow passages formed between the pillars;
   an electrolyte layer coated on the outer surface of the support excluding top surfaces of the pillars;
   a coating layer made of a second catalytic material and formed on a top surface of the electrolyte layer excluding the pillars; and
   a current collecting layer coated on the top surfaces of the pillars.

2. The solid oxide fuel cell module according to claim 1, wherein if the support is made of a catalytic material of air electrode or a catalytic material of fuel electrode, wherein the support made of the catalytic material of air electrode allows air to flow in the flow passages of the first fluid flow part and fuel gas to flow in the second fluid flow part, and the support made of the catalytic material of fuel electrode allows fuel gas to flow in the first fluid flow part and air to flow in the second fluid flow part.

3. The solid oxide fuel cell module according to claim 2, wherein the support has sealing areas adjacent to opposite edges of a top surface thereof where no pillars are formed and a sealing material is disposed to facilitate gas sealing.

4. The solid oxide fuel cell module according to claim 2, wherein the support has a plurality of partition walls therein to form a plurality of the flow passages, and the plurality of pillars on a top surface thereof,
   the module further comprising a plurality of the support stacked to form the flow passages between the pillars.

5. The solid oxide fuel cell module according to claim 1, wherein the support is provided with a thin coat thereon, the thin coat including the electrolyte layer, the coating layer made of a catalytic material having an opposite polarity to the support and a metallic material of the current collecting layer.

6. The solid oxide fuel cell module according to claim 1, wherein the flow passages of the support are honeycomb-shaped and each have an inner diameter ranging from 0.1 mm to 10 mm.

7. The solid oxide fuel cell module according to claim 6, wherein the support has partition walls between the flow passages each having a thickness of 0.1 mm to 5 mm.

8. The solid oxide fuel cell module according to claim 1, wherein the pillars on the top surface of the support have a square cross-section.

9. The solid oxide fuel cell module according to claim 8, wherein the pillars are spaced from each other at a distance of 0.1 mm to 10 mm and each have a height of 0.1 mm to 10 mm and a width of 0.1 mm to 10 mm.

10. The solid oxide fuel cell module according to claim 1, wherein the pillars on the top surface of the support body are elongated in parallel with each other to form flow passages therebetween,
    wherein each of the flow passages is provided with an inflow hole at one side and an exhaust hole at the other side, and constitutes the second fluid flow part.

11. The solid oxide fuel cell module according to claim 5, wherein the electrolyte layer is fully coated on an entire surface of the support excluding the top surfaces of the pillars.

12. The solid oxide fuel cell module according to claim 5, wherein the coating layer is made of a catalytic material of an opposite polarity to the catalytic material for forming the support, and coated on an entire outer surface of the electrolyte layer excluding the top surfaces and partial sides of the pillars.

13. The solid oxide fuel cell module according to claim 5, wherein the electrolyte layer, the coating layer and the current collecting layer each have a thickness up to 1000 μm.

* * * * *